United States Patent [19]

Alaria et al.

[11] Patent Number: 4,480,328

[45] Date of Patent: Oct. 30, 1984

[54] METHOD OF AND SYSTEM FOR COMMUNICATION VIA SATELLITE

[75] Inventors: Gian B. Alaria; Roberto Preti, both of Turin, Italy

[73] Assignee: Cselt - Centro Studi E Laboratori Telecomunicazioni S.p.A., Turin, Italy

[21] Appl. No.: 368,297

[22] Filed: Apr. 14, 1982

Related U.S. Application Data

[63] Continuation-in-part of Ser. No. 326,480, Dec. 2, 1981, abandoned.

[30] Foreign Application Priority Data

Dec. 3, 1980 [IT] Italy .................. 68840 A/80

[51] Int. Cl.³ .................................. H04J 15/00
[52] U.S. Cl. .................................. 370/63; 370/104
[58] Field of Search .................. 370/63, 104, 95, 97

[56] References Cited

U.S. PATENT DOCUMENTS

| | | | |
|---|---|---|---|
| 4,004,098 | 1/1977 | Shimasaki | 370/104 |
| 4,004,225 | 1/1977 | Gänssmantel | 370/104 |
| 4,320,501 | 3/1982 | Le Dieu et al. | 370/63 |

*Primary Examiner*—Douglas W. Olms
*Assistant Examiner*—Frank M. Scutch, III
*Attorney, Agent, or Firm*—Karl F. Ross

[57] ABSTRACT

Digitized message samples or bytes appearing in time slots of an outgoing PCM frame, temporarily allocated to respective local channels such as telephone lines of limited activity, are written during alternate storage periods of, say, 32 ms (each encompassing 256 PCM frames) in a pair of memories from which they are alternately read out in a different sequence to form special packets of interleaved bytes from respective channel pairs or other channel groupings. A number of such special packets are assembled together with other packets from more active channels into an outgoing TDMA frame which forms part of a superframe equal in length to a storage period; the TDMA frames are modulated at an accelerated bit rate upon an r-f carrier for transmission to a relay station aboard a satellite. Upon redistribution of the packets at the relay station according to their respective destinations, they are beamed back to earth for reception by other ground stations. There the special packets of incoming TDMA frames are alternately written, during like storage periods, in another pair of memories from which they are then read out in respective time slots of consecutive incoming PCM frames before being sent to their destinations. A TDMA frame period of each superframe is used to carry a synchronization code generated in the transmitting section and extracted in the receiving section of a ground station for correlating its operation with a clock aboard the satellite.

9 Claims, 4 Drawing Figures

METHOD OF AND SYSTEM FOR COMMUNICATION VIA SATELLITE

CROSS-REFERENCE TO RELATED APPLICATION

This is a continuation-in-part of our copending application Ser. No. 326,480 filed Dec. 2, 1981 and now abandoned.

FIELD OF THE INVENTION

Our present invention relates to a method of and a system for exchanging pulse-code-modulated (PCM) message samples between ground stations, via a satellite-borne switching stage referred to hereinafter as a relay station, by the time-division multiple-access (SS/TDMA) technique; the PCM samples are beamed by (usually phase-modulated) radio-frequency carriers from a transmitting section of one ground station toward the satellite and from the latter toward a receiving section of another ground station.

BACKGROUND OF THE INVENTION

In such a TDMA system (see, for example, commonly owned U.S. Pat. No. 4,215,348) the messages to be sent out arrive concurrently over local channels at a concentrating terminal associated with the transmitting ground station for sampling, digital coding and arrangement in time slots temporarily allocated to respective channels in a recurrent outgoing PCM frame, normally of 125 μs. Such a frame may have n=32 time slots, two of them (e.g. the 1$^{st}$ and the 17$^{th}$) being reserved for synchronizing and supervisory signals including address codes identifying the destinations of the messages conveyed in the remaining 30 time slots. The digitized message sample in each active time slot is normally an 8-bit byte, corresponding to a sampling rate of 64 kbit/sec. The overall bit rate of such a PCM frame is 2 Mbit/sec.

The characteristics of TDMA terminals present at the ground stations designed for satellite links are internationally specified by the most important space authorities, such as Intelsat and Eutelsat.

It is well known that at a TDMA ground station a 2 Mbit/sec PCM stream is to undergo various operations before being utilized to modulate the phase of the radio-frequency carrier used for transmission to the satellite. More particularly, sixteen 8-bit samples or bytes of each channel can be grouped together in orderly sequence. Within a given time interval of 2 ms, which may be referred to as a TDMA frame period, the 128 bits of such a of p=16 bytes sequence are converted to a higher speed and combined with the bits of other PCM streams by a multiplexing operation, thus yielding a standard outgoing TDMA frame of the same duration as the initial sequence.

On the other hand, precise specifications relating to SS/TDMA installations have not yet been internationally defined. In particular, the time corresponding to the shortest switching unit or packet aboard the satellite is still to be standardized.

A value corresponding to thirty DSI (Digital Speech Interpolation) channels, namely sixty telephone circuits, is an acceptable digital-sequence length. This value affords a reasonable frame efficiency, given as the ratio between the length of the utilized frame portion to the overall frame length, and is compatible with the aforementioned 2 Mbit/sec PCM transmission systems carrying 32 channels of 64 kbit/sec, i.e. 30 channels for speech, one channel for signaling and one channel for synchronization.

This technique, however, is unsatisfactory in areas of low traffic density where only a few messages at a time are intended for a given remote ground station.

OBJECTS OF THE INVENTION

Thus, the general object of our present invention is to provide an improved method of and system for satellite communication facilitating the exchange of messages among ground stations with PCM terminals serving a large number of lines some of which may have a low traffic volume.

A more particular object is to insure proper synchronization of the transmitting and receiving ground stations with each other and with the relay station aboard the satellite.

SUMMARY OF THE INVENTION

In accordance with our present invention, the message samples of a plurality p.m of consecutive outgoing PCM frames are registered during a predetermined storage period—e.g. of 32 milliseconds—at a transmitting section of a ground station sending outgoing TDMA frames to a satellite-borne relay station. In an immediately following storage period of the same duration, the messages previously registered are regrouped in a plurality p of special blocks or packets of identical length equal to a TDMA frame period, each packet containing all the samples of a limited number q·n/m of homologous time slots with destinations reachable through a common remote ground station. The special packets so formed, jointly containing the samples of all active time slots of n.p (e.g. 256) consecutive PCM frames, are assembled with byte sequences of like duration from other channel groupings of the same ground station in respective outgoing TDMA frames included in a superframe modulated upon a carrier beamed toward the satellite, with suitable acceleration of the bit rate as noted above. The number of TDMA frames in a superframe equals the maximum number m of such special packets, e.g. sixteen. The packets are switched at the relay station to a carrier beamed to a receiving station of a ground station which serves the destinations of the message samples contained in them, each such packet arriving at that station in an incoming TDMA frame together with other packets intended for subscribers associated with the same station; during a storage period of the predetermined duration referred to above, received special packets differing from one another in the destinations of their message samples are registered for regrouping during the next-following storage period in active time slots of incoming PCM frames temporarily allocated to their respective destinations. Numbers m, n, p and q are all integers.

When each packet so treated contains samples from two or more contributing sources, i.e. with q>1, these samples are preferably arrayed in alternating groups in an outgoing special packet.

The special packets or blocks conforming to our present invention are of the same length as conventional packets incorporating, say, 30 bytes of a PCM frame; thus, our present system is entirely compatible with existing installations which can be adapted to it by the mere addition of some supplemental equipment at the ground and relay stations.

Such supplemental equipment comprises, pursuant to another aspect of our invention, first memory means at a transmitting section of a ground station commanded by first control means for storing the message samples of outgoing PCM frames and enabling their readout, upon regrouping in the aforedescribed blocks or packets, in the next-following storage period; the equipment further comprises second memory means at a receiving section of a ground station commanded by second control means for performing complementary storing and readout operations on incoming blocks relayed by the satellite station. Advantageously, the first and the second memory means each comprise a pair of memories alternately written and read during respective storage periods with the aid of the associated control means. The relay station need only be supplemented with means for controlling its switching matrix to direct the blocks of a superframe from an arriving beam to the proper departing beam or beams.

Advantageously, pursuant to another feature of our invention, a certain fractional period of each outgoing superframe is left free of message samples but contains a synchronization code which is generated at a transmitting section and extracted at a receiving section of the same ground station in order to correlate the operation of a time base at the ground station with a clock aboard the satellite.

BRIEF DESCRIPTION OF THE DRAWING

The above and other features of our invention will now be described in detail with reference to the accompanying drawing in which.

SPECIFIC DESCRIPTION

Figure 1:
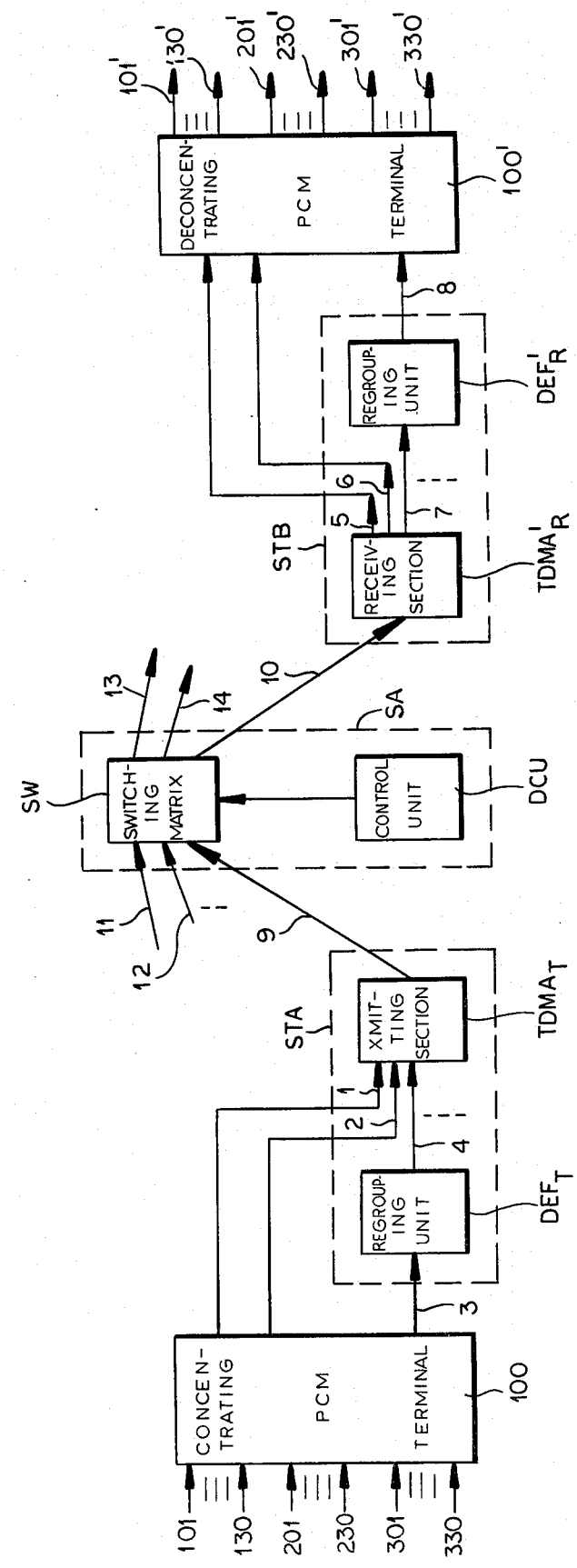
FIG. 1 is an overall block diagram showing parts of two ground stations and of a satellite-borne relay station.

In FIG. 1 we have shown two ground stations STA and STB communicating with each other via a relay station aboard a satellite SA. Ground station STA comprises a transmitting section $TDMA_T$ to which outgoing PCM frames are fed from a concentrating terminal 100 via leads 1, 2 carrying digitized voice samples (referred to hereinafter as bytes) from respective local channels 101-130, 201-230 assumed to be part of a set of highly active telephone circuits. Another set of channels 301-330 from less active sources carry messages whose bytes are delivered, also in the form of PCM frames, via a lead 3 to a regrouping unit $DEF_T$ from which they pass in the form of special blocks or packets, each assigned to a pair of such channels, via a lead 4 to transmitting section $TDMA_T$ for assembly into an outgoing TDMA frame together with other packets in the form of conventionally organized byte sequences from leads 1, 2 and others not shown. Each TDMA frame, 16 of which constitute a superframe, is phase-modulated at a suitably increased bit rate upon a carrier directed in the form of a beam 9 (referred to in the art as an up-link) toward the satellite SA receiving similar beams 11, 12 from other ground stations.

At the relay station aboard the satellite, the packets carried by the arriving beams 9, 11, 12 pass after demodulation through a switching matrix SW for redistribution, according to the pertinent address information, to departing beams or down-links 10, 13, 14. Beam 10 reaches a receiving section $TDMA'_R$ of ground station STB where the demodulated packets of some of the incoming TDMA frames are directly sent to a deconcentrating PCM terminal 100' by way of respective leads 5 and 6 for distribution of their bytes to local channels 101'-130', 201'-230'. Other packets, having the form of special blocks analogous to those produced by regrouping unit $DEF_T$, travel over a lead 7 to a complementary regrouping unit $DEF'_R$ which rearranges their bytes in active time slots of an incoming PCM frame respectively allocated to local channels 301'-330'; the resulting bit stream reaches the terminal 100' over a lead 8.

FIG. 1 also shows a satellite-borne unit DCU controlling the operation of switching matrix SW. A receiving section identical with section $TDMA'_R$ and a transmitting section identical with section $TDMA_T$ are, of course, also provided at stations STA and STB, respectively.

Figure 2:
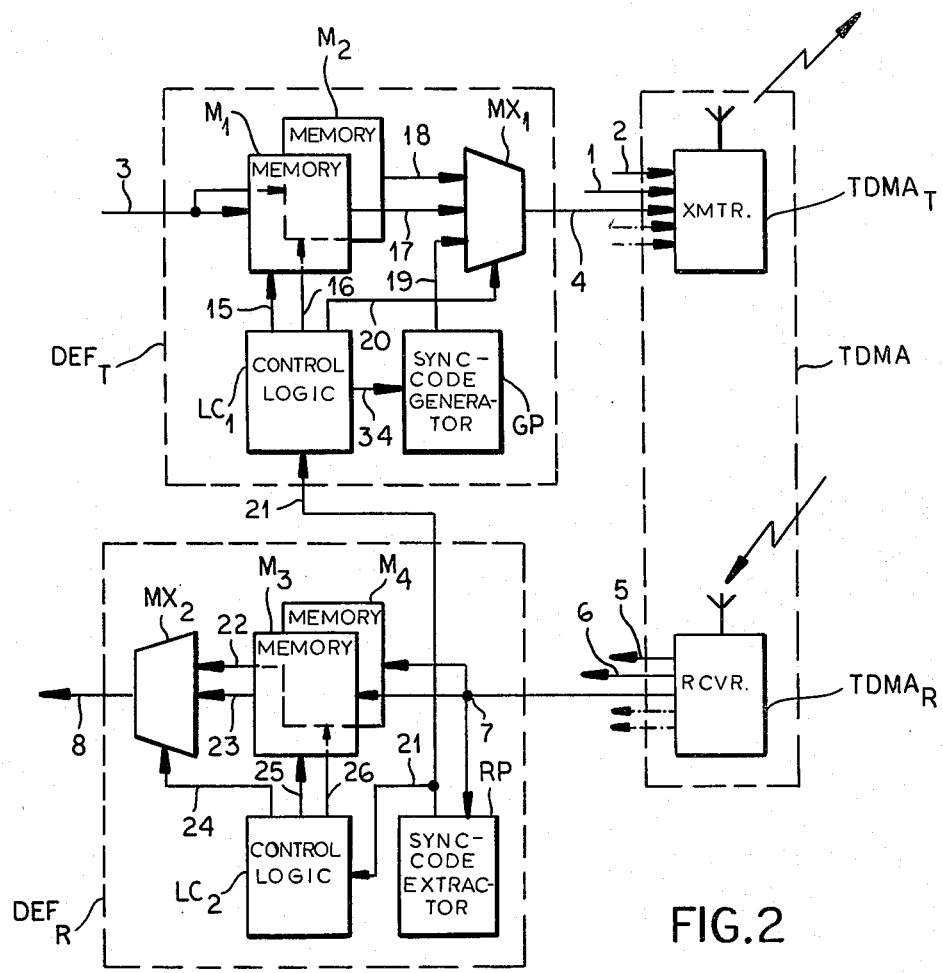
FIG. 2 shows details of a transmitting section and a receiving section of one of the ground stations illustrated in FIG. 1.

FIG. 2 shows details of two regrouping units $DEF_T$, $DEF_R$ respectively associated with a transmitting section $TDMA_T$ and a receiving section $TDMA_R$ of a carrier terminal TDMA of a ground station such as that shown at STA in FIG. 1. Unit $DEF_T$ comprises a pair of memories $M_1$, $M_2$ with writing inputs connected in parallel to lead 3 and with reading outputs connected via respective leads 17 and 18 to inputs of a multiplexer $MX_1$ working into lead 4. A further input of multiplexer $MX_1$ is connected to a lead 19 originating at a sync-code generator GP controlled, via a lead 34, by a logic network $LC_1$ also controlling the alternate reading and writing of memories $M_1$ and $M_2$ by way of respective address multiples 15 and 16. Multiplexer $MX_1$ is switched by an output lead 20 of control logic $LC_1$.

A time base in network $LC_1$ periodically activates the sync-code generator GP and is in turn synchronized by signals arriving over a lead 21 from a sync-code extractor RP in regrouping unit $DEF_R$. An input of extractor RP is connected to lead 7 in parallel with writing inputs of another pair of memories $M_3$ and $M_4$ whose reading outputs are connected via respective leads 22 and 23 to inputs of a multiplexer $MX_2$ working into lead 8. Another logic network $LC_2$, timed by the signal on lead 21, controls the alternate writing and reading of memories $M_3$, $M_4$ via respective address multiples and also switches the multiplexer $MX_2$ via a lead 24.

In operation, memory $M_1$ is loaded with the bytes of 256 consecutive PCM frames over a storage period of 32 ms even as the contents of memory $M_2$, loaded during the preceding storage period, are read out in a manner more fully described hereinafter. Multiplexer $MX_1$ thus connects lead 4 to leads 16 and 18 in alternate storage periods and to lead 19 during a fraction of each such period in which the synchronization code is emitted by generator GP. When that code appears on lead 7 after being retransmitted to the same ground station by the satellite, extractor RP realigns the time bases of both logic networks $LC_1$ and $LC_2$ with the satellite clock for properly timing the reading from memories $M_1$, $M_2$ and the writing in memories $M_3$, $M_4$.

Figure 3:
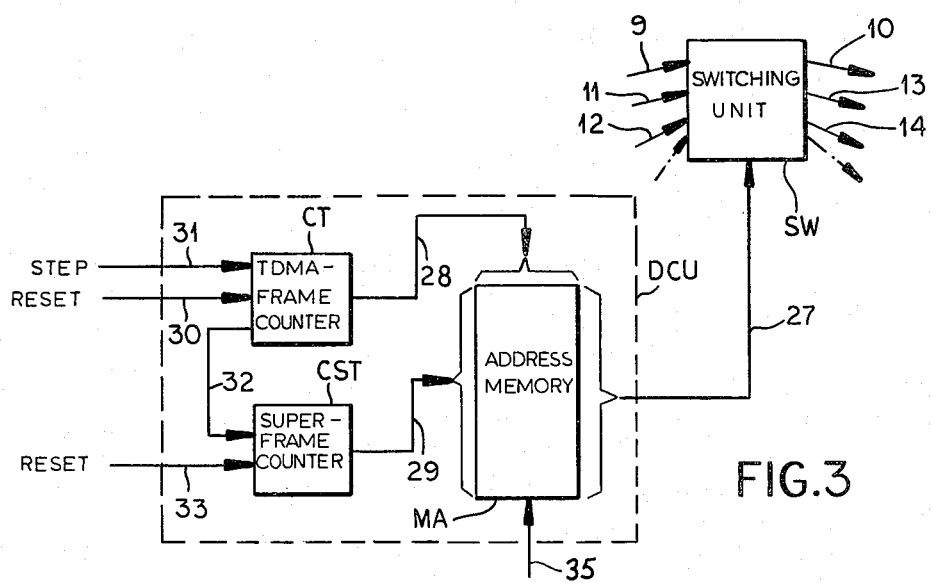
FIG. 3 shows details of the relay station illustrated in FIG. 1.

As shown in FIG. 3, control unit DCU of satellite SA comprises an address memory MA, a TDMA-frame counter CT and a superframe counter CST. Memory MA is divided into as many zones (here 16) as there are TDMA frames in each superframe, each zone containing the addresses of bit packets contained in a respective TDMA frame. Counter CT has a stepping input 31, receiving clock pulses from a time base aboard the satellite, and a resetting input 30 energized with a periodic frame-synchronizing signal generated by the same time base. Each resetting of counter CT energizes a stepping input 32 of counter CST which is periodically reset by a likewise locally generated superframe-synchronizing signal on an input 33 thereof. An output multiple 28 of counter CT successively reads the cells of a memory zone identified by signals appearing on an output multiple 29 of counter CST. The addresses thus read out from memory MA are fed via a multiple 27 to switching matrix SW, causing the bit packets demodulated from up-links 9, 11, 12 to be modulated upon the proper down-links 10, 13, 14. These addresses may be loaded through a connection 35 into the memory MA by supplementary information preceding or accompanying the message bits, e.g. with the aid of supermodulation as described in commonly owned U.S. Pat. No. 4,131,761.

Address memory MA may be regarded as divided into a frame-address store controlled by counter CT and a superframe-address store controlled by counter CST. The first store identifies the special packets in any TDMA frame to be switched by unit SW while the second store designates within each superframe the TDMA frames containing such packets. Since, generally, not all TDMA frames of a superframe will contain special packets and since only some of the time positions of any TDMA frame will normally be occupied by packets of this sort, the required capacity of these stores will usually be much less than the theoretical maximum.

Figure 4:
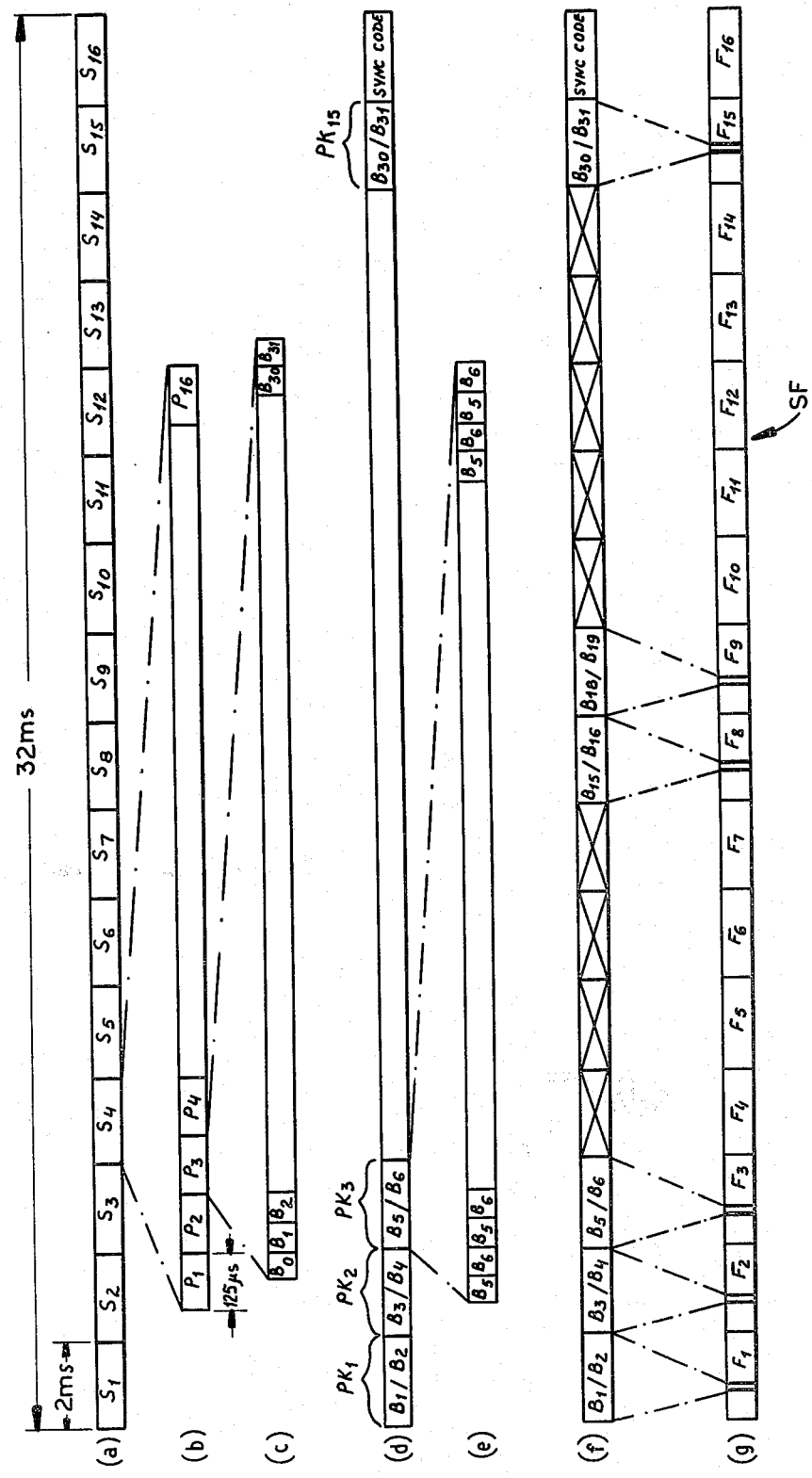
FIG. 4 is a timing diagram showing the regrouping of message samples from a succession of PCM frames in a TDMA superframe.

We shall now describe, with reference to FIG. 4, the regrouping of the bytes of outgoing PCM frames on lead 3 by unit $DEF_T$ and the insertion of the resulting packets into outgoing TDMA frames by transmitting section $TDMA_T$.

As shown in graph (a) of FIG. 4, the bytes of 256 PCM frames are initially grouped in P=16 sequences $S_1$-$S_{16}$ with a duration of 2 ms, corresponding to a TDMA frame period, together accounting for a storage period of 32 ms. Individual PCM frames $P_1$-$P_{16}$, each lasting for 125 μs, are shown specifically for sequence $S_4$ in graph (b). Graph (c) illustrates the n=32 time slots of such a PCM frame, specifically frame $P_3$, occupied by bytes $B_0$, $B_1$, ... $B_{31}$. As noted above, the first byte $B_0$ as well as the $17^{th}$ byte (omitted in the graph) are not assigned to any speech channel but are reserved for signaling and synchronization. As the PCM frames arriving over lead 3 are assumed to be assigned to telephone lines of low traffic density, only some of the channels represented by the 30 other bytes of a PCM frame will be active at any given time.

In graph (d) the bytes of graph (c) are shown regrouped into 15 special packets $PK_1$-$PK_{15}$, each lasting for a TDMA frame period of 2 ms, respectively containing bytes $B_1/B_2$, $B_3/B_4$, $B_5/B_6$ and so forth; the last TDMA period is used for the synchronization code periodically appearing on lead 19 of FIG. 2 as well as other supervisory signals. Each of these packets contains 256 pairs of bytes, provided the two channels represented by these bytes are active, alternating in 16-byte groups respectively indicated at $B_5$ and $B_6$ in graph (e) for the third packet $PK_3$ of graph (d). The same 15-packet series is shown in graph (f) where, by way of example, it has been assumed that only six of these packets contain the bytes of active channels, namely bytes $B_1/B_2$, $B_3/B_4$, $B_5/B_6$, $b_{15}/B_{16}$, $B_{18}/B_{19}$ and $B_{30}/B_{31}$. These active special packets are then compressed into narrower time zones of respective outgoing TDMA frames $F_1$-$F_{15}$ of a 32-ms superframe SF, a $16^{th}$ TDMA frame $F_{16}$ carrying the synchronizing and other supervisory signals. The parts of frames $F_1$-$F_{15}$ not occupied by the compressed packets of graph (f) are utilized for packets of conventional type formed from consecutive bytes of more active PCM channels arriving over leads 1, 2, ... as shown in FIGS. 1 and 2. The packets, of course, must also convey the destinations of their respective bytes, e.g. by the aforementioned supermodulation technique.

If a superframe SF were extended to 64 ms so as to contain 32 TDMA frames, each message unit or packet in a regrouped frame according to our invention would contain 256 bytes of a single time slot. With a superframe reduced to m=8, 4 or 2 TDMA frames the packets PK would include the bytes of q=4, 8 and 16 time slots, respectively. This would, of course, require a corresponding lengthening or foreshortening of the storage period of memories $M_1$-$M_4$ and a modification of their reading or writing patterns.

Whatever the configuration of such a packet, its extraction from an incoming TDMA frame will be followed by a regrouping in unit $DEF_R$ to produce in each storage period a series of PCM frames in which the bytes of up to time slots appear in their normal order as parts of the bit stream issuing from multiplexer $MX_2$.

We claim:
1. A method of exchanging digitized message samples between ground stations via a relay station aboard a communication satellite, in a system wherein such samples are entered in active time slots of an outgoing PCM frame temporarily allocated to respective sources and are modulated at an accelerated bit rate, as part of an outgoing TDMA frame, upon a radio-frequency carrier beamed toward the satellite from a transmitting section of a ground station, each TDMA frame having a period encompassing a multiplicity of PCM frames and consisting of a plurality of packets individually switchable by the relay station to another carrier beamed toward a receiving section of another ground station as part of an incoming TDMA frame for demodulation and entry of their samples in active time slots of an incoming PCM frame temporarily allocated to respective destinations thereof, each TDMA frame consisting of p PCM frames of n time slots each, comprising the steps of:
   (a) registering at said transmitting section the message samples of a plurality p.m of consecutive outgoing PCM frames during a predetermined storage period encompassing m TDMA periods with m>1 and p>1;
   (b) regrouping the registered message samples, during an immediately following storage period, in a plurality of special packets of identical length equal to a TDMA period, each of said special packets containing all the message samples of a limited number q=n/m of homologous time slots with destinations reachable through a common remote ground station;
   (c) successively assembling said special packets together with other packets of like length in respective outgoing TDMA frames with an accelerated bit rate;

(d) modulating each outgoing TDMA frame, as part of a superframe of m TDMA frames with a duration equaling said storage period, upon a carrier beamed toward the satellite;

(e) switching each of said packets at said relay station to a carrier beamed to a receiving section of a ground station serving the destinations of the message samples contained therein;

(f) registering at said receiving section, for the duration of said storage period, special packets of incoming TDMA frames differing from one another in the destinations of their message samples; and (g) regrouping the message samples of the special packets registered in step (f), during the next-following storage period, in time slots of incoming PCM frames temporarily allocated to their respective destinations.

2. A method as defined in claim 1 wherein message samples from time slots allocated to a plurality of said sources are arrayed in alternating groups in an outgoing special packet.

3. A method as defined in claim 1 wherein a TDMA period in each outgoing superframe is used to carry a synchronization code generated at the transmitting section of a given ground station and is addressed to the same ground station whose receiving section extracts said synchronization code after retransmission by said relay station for correlating the operations of said given ground station with those of said relay station.

4. A method as defined in claim 1, 2 or 3 wherein said storage period extends over p.m = 256 PCM frames and said superframe encompasses m = 16 TDMA frames, with n = 32.

5. A system for exchanging digitized message samples between ground stations via a relay station aboard a communication satellite, comprising:

first memory means at a first ground station for registering, during a predetermined storage period, message samples present in time slots of a plurality p.m of consecutive outgoing PCM frames of n time slots each with m > 1 and p > 1, said time slots being temporarily allocated to respective sources linked with said first ground station;

first control means at said first ground station for reading out the message samples registered in said first memory means, during an immediately following storage period, and regrouping the read-out message samples in a plurality of special packets of identical length equal to a predetermined fraction 1/m of said storage period, each of said special packets containing all the message samples of a limited number q = n/m of homologous time slots reachable through a common remote ground station;

transmitting means at said first ground station coupled to said first memory means and commanded by said first control means for successively assembling said special packets together with other packets of like length in respective outgoing TDMA frames with an accelerated bit rate modulated, as part of a superframe of m TDMA frames whose duration equals said storage period, upon a radio-frequency carrier beamed toward said satellite;

switching means at said relay station for transferring each of said packets to a carrier beamed to a second ground station linked with the destinations of the message samples thereof;

receiving means at said second ground station;

second memory means at said second ground station coupled to said receiving means for registering special packets of incoming TDMA frames, differing from one another in the destinations of their message samples, for the duration of said storage period; and second control means at said second ground station for reading out the message samples of the special packets registered in said second memory means, during the next-following storage period, in time slots of incoming PCM frames temporarily allocated to their respective destinations.

6. A system as defined in claim 5 wherein said first and second memory means respectively comprise a first and a second pair of memories alternately written and read during respective storage periods.

7. A system as defined in claim 6, further comprising a first multiplexer, responsive to said first control means and inserted between said first pair of memories and said transmitting means, and a second multiplexer, responsive to said second control means and inserted between said second pair of memories and a terminal giving access to said destinations.

8. A system as defined in claim 5, 6 or 7 wherein said first and second ground stations are substantially identical and are provided with timing means for correlating the operations of said first and second control means with a clock aboard the satellite, said timing means including a signal generator with an input connected to said first control means and with an output connectable to said transmitting means during a certain fractional period of an outgoing superframe unoccupied by said message samples for emitting a synchronization code to said relay station, said timing means further including a signal detector with an input connected to said receiving means and with an output connected to said first and second control means for maintaining same in step with said synchronization code as received back from said relay station.

9. A system as defined in claim 8 wherein said relay station is provided with storage means for registering the addresses of the destinations of special packets contained in TDMA frames of an arriving superframe and counting means controlled by said clock for reading out successive destination addresses from said storage means to said switching means during each superframe.

* * * * *